United States Patent [19]
Miyagawa et al.

[11] Patent Number: 5,766,307
[45] Date of Patent: Jun. 16, 1998

[54] METHOD OF TREATING ZINC-CONTAINING SUBSTANCE

[75] Inventors: Shoji Miyagawa; Hiroshi Itaya; Tetsuya Fujii; Yoshiaki Hara, all of Chiba, Japan

[73] Assignee: Kawasaki Steel Corporation, Japan

[21] Appl. No.: 723,026

[22] Filed: Sep. 30, 1996

[51] Int. Cl.⁶ .................................................. C22B 19/04
[52] U.S. Cl. .................................. 75/378; 75/419; 75/660; 75/665
[58] Field of Search .................................. 75/378, 419, 660, 75/665

[56] References Cited

U.S. PATENT DOCUMENTS 3,592,631  7/1971  Cattelain ............................. 75/660
5,372,630  12/1994  Foo et al. ............................ 75/10.3

FOREIGN PATENT DOCUMENTS 0 551 992 A1  1/1993  European Pat. Off. .
0 626 457 A1  4/1994  European Pat. Off. .
0 686 703 A1  12/1995  European Pat. Off. .
58 147528 A  9/1983  Japan .
07 173548 A  7/1995  Japan .

*Primary Examiner*—Melvyn Andrews
*Attorney, Agent, or Firm*—Austin R. Miller

[57] ABSTRACT

Method and apparatus for collecting valuable products, particularly zinc, from a zinc-containing substance such as electric furnace dust. A shaft type smelting reduction furnace has a packed bed of a carbonaceous solid reducing agent and has upper and lower tuyeres, and a zinc-containing substance is injected through tuyeres to reduce and vaporize zinc, which is directly contacted by a liquid coolant thereby forming a slurry, and the zinc product is collected from the slurry.

8 Claims, 5 Drawing Sheets

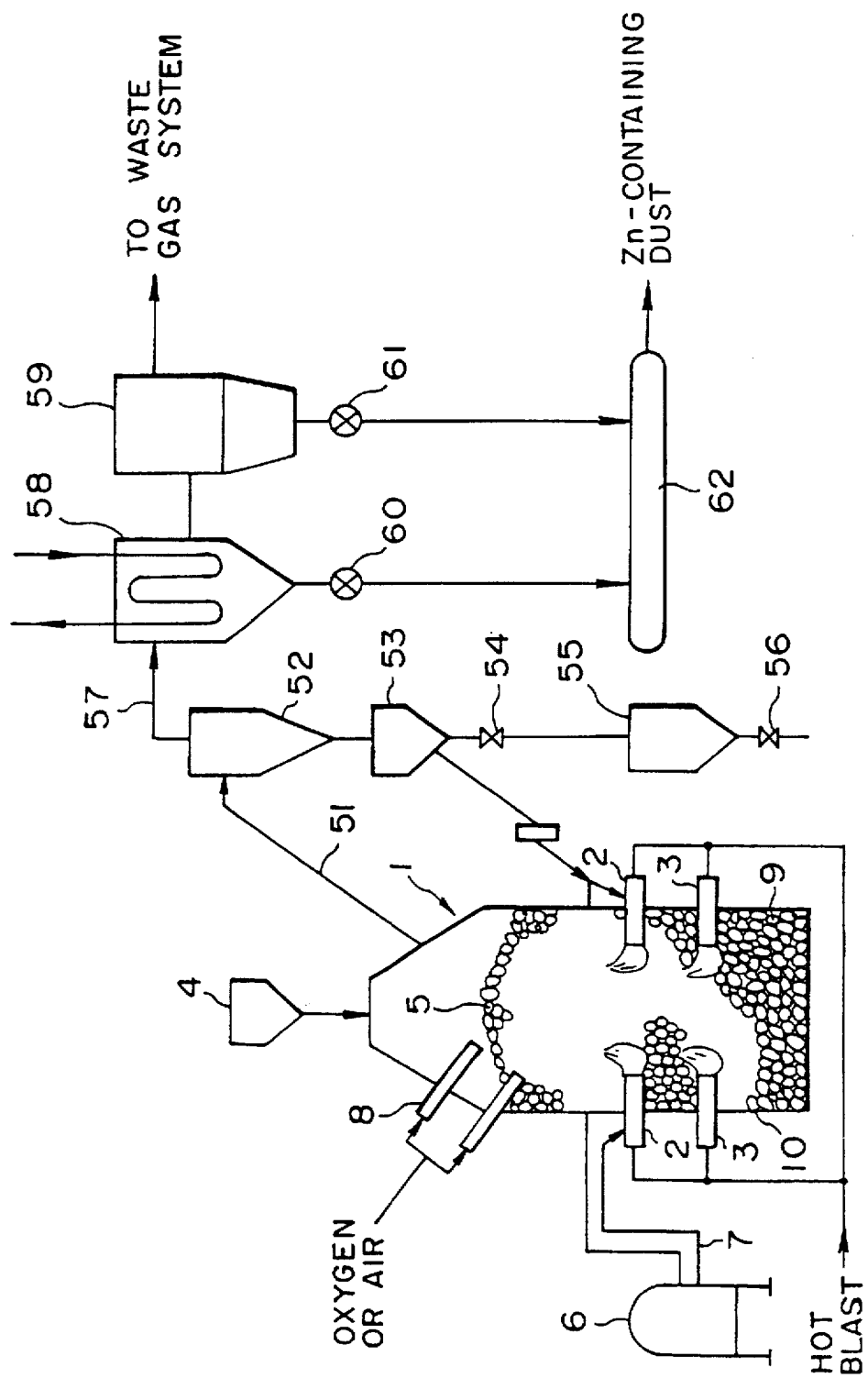
FIG. 5
CONVENTIONAL

METHOD OF TREATING ZINC-CONTAINING SUBSTANCE

BACKGROUND OF THE INVENTION

1. Field of the Invention

The present invention relates to a method of collecting valuable materials, particularly zinc, from a zinc-containing substance treated in a shaft type smelting reduction furnace provided with a packed bed of a carbonaceous solid reducing agent and having upper and lower tuyeres.

2. Description of the Related Art

From the point of view of recycling resources or saving energy, it is the common practice at present to recycle iron scrap, which comes from a wide variety of sources with large differences in quality.

For example, "home scrap" is iron scrap that is generated in the manufacture of iron and steel. It is mostly consumed within the plant itself, because its quality and origin are known and the impurities are kept at a low level.

On the other hand, secondary scrap or obsolete scrap is recovered in secondary processing and finishing of steel products, and contains a considerable amount of scrap of surface-treated steel sheets and special steels. Most of these types of scrap are melted, refined and reused by electric furnace steel producers. Electric furnace dust is generated by this process. This electric furnace dust contains from 10 to 40% zinc and from 25 to 50% iron, in addition to chromium, cadmium and lead which may cause environmental pollution through dissolution when dumped for reclamation. There are other zinc-containing substances, such as sludge leached in a hydrometallurgy process of zinc, zinc-containing sludge generated during a waste fluid treatment in a zinc-plating process, and shredder dust. Under these circumstances, there has been a strong demand for separating detrimental metals such as chromium, cadmium and lead at a low cost from zinc-containing substances and collecting and reusing useful metals such as zinc and iron.

Using for this purpose a shaft type smelting reduction furnace having upper and lower tuyeres is disclosed in Japanese Unexamined Patent Publication No. 7-173,548.

FIG. 5 illustrates such an apparatus. The number 1 represents a shaft type smelting reduction furnace. Furnace gas comprising a dust mainly consisting of carbon and ash, and waste gas, containing Zn vapor, generated by combustion of a carbonaceous solid reducing agent is sent out of the upper part of the furnace 1 through a waste gas duct 51 to a cyclone 52. Most of the carbon and a small quantity of zinc are separated from the furnace gas in the cyclone 52. Part of the separated carbon is sent through a hopper 53 into the furnace 1, and the rest of carbon and zinc are discharged through a valve 54, a dust discharge hopper 55, and another valve 56 outside of the system. The rest of the furnace gas passed the cyclone 52 is sent through a waste gas duct 57, to a cooling tank 58 which cools the furnace gas to remove some of the coarse dust and a part of zinc. The furnace gas comprising the remaining waste gas and fine dust are sent to a bag filter 59 where most of the dust and zinc is collected. Zinc-containing dust is collected in the cooling tank 58 and in the bag filter 59 is discharged through valves 60 and 61 by a transport unit 62 outside the system. The zinc-vapor-removed waste gas is discharged outside the system from the bag filter 59.

When treating a zinc-containing substance such as electric furnace dust by the method described above, the zinc-containing substance is injected through upper tuyeres 2. Zinc oxide contained in the zinc-containing substance is reduced to metallic Zn which is vaporized and passes through the packed bed 5 of carbonaceous material as a vapor through a waste gas duct 57 arranged at the upper portion of the furnace 1. At this point, however, problems arise because of the presence of a dust collector such as a cyclone or a bag filter or a cooling tank of the indirect cooling type, in which the material to be cooled and cooling water do not come into direct contact.

One problem arises when furnace gas comprising dust and waste gas containing Zn vapor is introduced into a cooling tank of the indirect cooling type. Zinc-containing dust adheres to the surface of the cooling water piping and the inner wall of the cooling tank, which is difficult to peel off and remove, and the deposit grows into lumps and makes it impossible to smoothly discharge the zinc-containing dust.

Another problem arises when a large quantity of zinc-containing dust adheres to the cooling water piping and the cooling tank inner wall in the indirect cooling type cooling tank. The flow path of waste gas is reduced in area, which leads to excessive pressure loss in the system, causing unstable operation.

Still another problem arises when a large quantity of zinc-containing dust adheres to the cooling water piping in the indirect type cooling tank. The dust and gas cooling efficiency is seriously impaired, resulting in an increase of waste gas temperature. This in turn tends to lead to damage to the bag filter or the discharge apparatus.

SUMMARY OF THE OBJECTS OF THE INVENTION

An object of the present invention is therefore to treat a zinc-containing substance such as electric furnace dust without causing the foregoing problems.

SUMMARY OF THE INVENTION

The present invention provides a shaft type smelting reduction furnace having an inlet area and an exit area and provided with a packed bed of a carbonaceous solid reducing agent and having upper and lower tuyeres, which comprises the steps of:

injecting a zinc-containing substance together with a flux through at least one of said upper tuyeres;

generating a furnace gas comprising a dust mainly consisting of carbon and ash, and waste gas, containing Zn vapor, generated by combustion of a carbonaceous solid reducing agent into said furnace, contacting a liquid coolant with said furnace gas at said exit area of said furnace, thereby taking up zinc in said liquid coolant to form a slurry, while removing gases generated by combustion of said carbonaceous solid reducing agent, and processing said slurry and collecting said zinc.

The present invention also provides a shaft type smelting reduction furnace provided with a packed bed of a carbonaceous solid reducing agent, said furnace having upper and lower tuyeres, which apparatus comprises:

a cooling unit having cooling means constructed and arranged for directly contacting with a liquid coolant a furnace gas comprising a dust which mainly consists of carbon and ash, and a waste gas, containing Zn vapor, generated in said furnace by combustion of said carbonaceous solid reducing agent, thereby introducing zinc from said furnace gas into a slurry by suspension, said apparatus further comprising a cooling tank constructed and arranged for cooling said slurry;

a settling tank positioned for settling said slurry;

a dehydrating tank arranged for dehydrating said slurry; and transfer means for discharging the resulting thickened slurry containing said metallic zinc.

Other features of the present invention, together with variations thereof, will become apparent from the following detailed description, and from the drawings, of which:

BRIEF DESCRIPTION OF THE DRAWINGS

FIG. 5 illustrates conventional treatment of a zinc-containing substance.

DESCRIPTION OF THE PREFERRED EMBODIMENTS

The present invention will now be described in detail with reference to the drawings, which are intended only as illustrative and are not intended to define or to limit the scope of the invention, which is defined in the appended claims.

Figure 1:
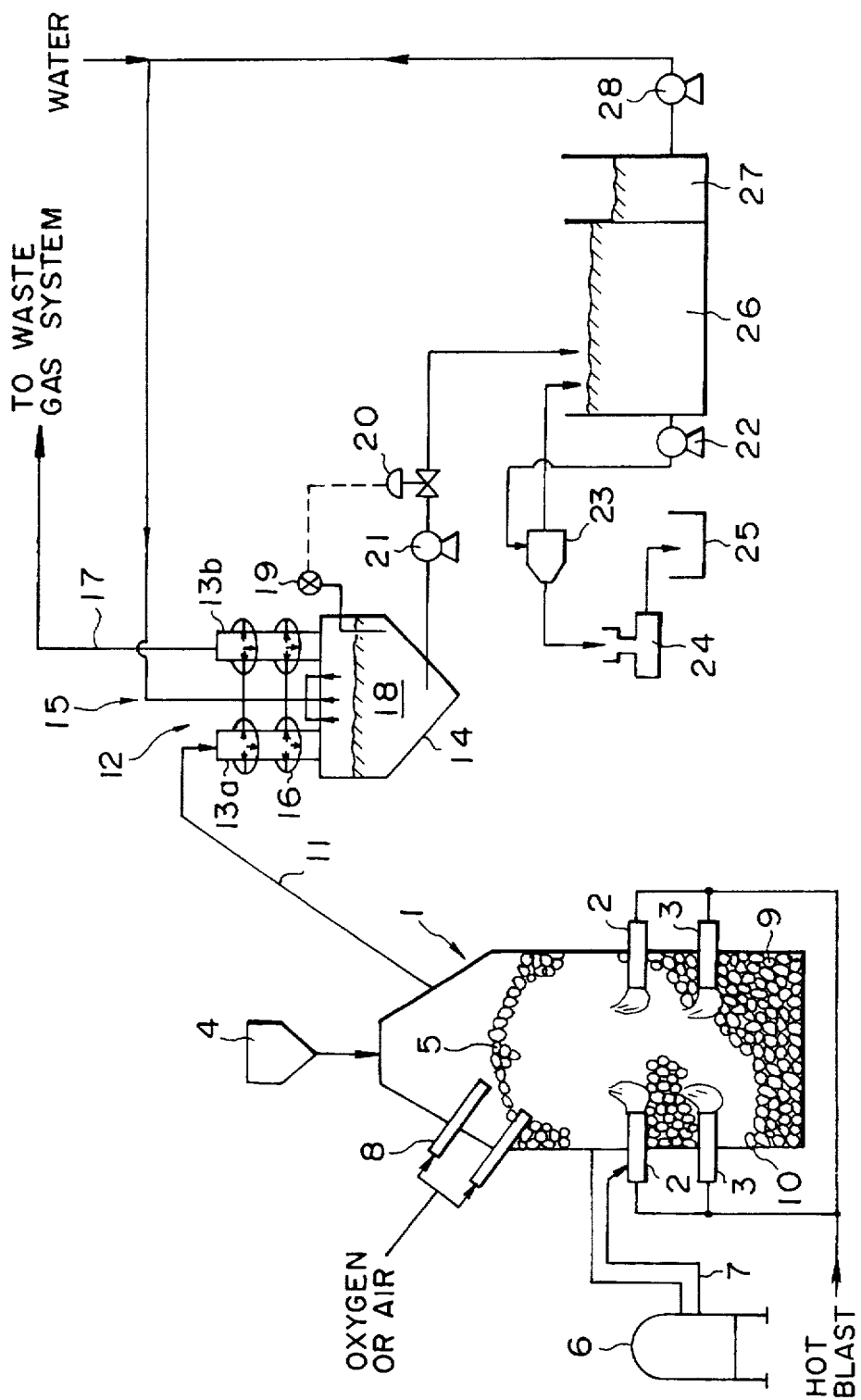
FIG. 1 illustrates a treatment plant embodying features of the present invention.

FIG. 1 illustrates a shaft type smelting reduction furnace 1 supplied by a hopper 4 with carbonaceous material, providing a packed bed 5 at the furnace top.

A zinc-containing substance together with a flux comprising a limestone and a silica is injected into the furnace 1 by a powder injector 6 through a pipe 7 and the upper tuyeres 2 of the furnace 1. Note, when a zinc-containing substance is not in a powder form, the zinc-containing substance has to be connected to a powder form before its injection into the furnace. The flux is added to adjust slag viscosity and melting point.

An air blast is heated to about 800° to 1,000° C. and blown into the furnace 1 through the upper tuyeres 2 and the lower tuyeres 3. At this point, oxygen is supplied in an appropriate amount to provide a hot blast as required for combustion of the carbonaceous material in the furnace 1. Combustion heat and reducing gas melt the zinc-containing substance injected by the upper tuyeres 2.

Zinc oxide contained in the zinc-containing substance is reduced to metallic Zn, which is vaporized and passes through the hot packed bed 5 of carbonaceous material and is discharged as a vapor through a waste gas duct 11 located at the upper portion of the furnace 1. A secondary combustion burner 8 arranged at or near the top of the furnace 1 burns waste gas in an amount to keep the temperature of the upper part of the packed bed 5 at about 600° to 1,000° C., at which temperature the Zn vapor is stabilized, as a vapor.

Iron oxide contained in the zinc-containing substance, together with chromium and the like, melts in a raceway at the tuyere nose of the upper tuyeres 2 under the influence of combustion heat from the hot carbonaceous material, and the resultant melt flows downwardly through the packed bed 5 of the carbonaceous material toward the lower tuyeres 3, during which the melt is reduced through counter-flow contact with reducing gas generated at the tuyere nose of the lower tuyeres 3. At the same time the melt flow contacts with the carbonaceous material in the packed bed 5 while dropping, and is directly reduced and separated into metal and slag.

Molten metal eventually accumulating on the hearth is discharged from a taphole 9, and slag is discharged from a cinder notch 10. At this point, chromium and the like are fixed in the molten metal and are, accordingly, not detrimental.

On the other hand, furnace gas comprising dust mainly consisting of carbon and ash, and waste gas containing Zn vapor generated by combustion of a carbonaceous solid reducing agent, is discharged through the waste gas duct 11 at the top of the furnace 1 to the cooling unit 12.

The cooling unit 12 is composed of a cooling tank 14 provided with cooling cylinders 13a and 13b, and cooling means 15 are provided which supply liquid coolant such as cooling water via a spray 16 to the cooling cylinders 13a and 13b and the cooling tank 14. Cooling cylinder 13a is connected to the waste gas duct 11, and the other cooling cylinder 13b is connected to an exit duct 17.

Furnace gas emanating from the waste gas duct 11 is introduced into the cooling tank 14 and is cooled by cooling means 15 for removal of dust, which forms a suspension with the liquid coolant at the bottom of the cooling tank 14, thus becoming a slurry 18.

The treated and cooled waste gas is discharged from the system through the exit duct 17 at a waste gas temperature of up to 200° C. The slurry 18 accumulating on the bottom of the cooling tank is transported by a slurry pump 21 to a settling tank 26. Its liquid level is adjusted by a level gauge 19 and a flow regulating valve 20. The slurry 18 is then pumped from the bottom of the settling tank 26 by means of another slurry pump 22 to a dehydrating machine 23, in which the slurry 18 is dehydrated to a concentration within a range of from about 40 to 80%, or preferably, of from about 50 to 70%, and then discharged through a slurry transport unit 24 to a container 25 in the form of a thickened slurry.

Waste liquid from the dehydrating machine 23 is sent to the settling tank 26, and dust and other solids contained in waste liquid are caused to settle, and treated liquid from which solids have been almost eliminated is circulated by means of a treated liquid pump 28 through cooling means 15 to the cooling tank 14.

The slurry dust collected in the dehydrating machine 23 should have a concentration within a range of from about 40 to 80% by weight. With a slurry dust concentration of under about 40%, the amount of the waste liquid increases, and this requires a larger capacity settling tank 26. With a slurry dust concentration of over about 80%, a larger load is imposed on the slurry transport unit 24, endangering clogging of the transport pipe.

Figure 2:
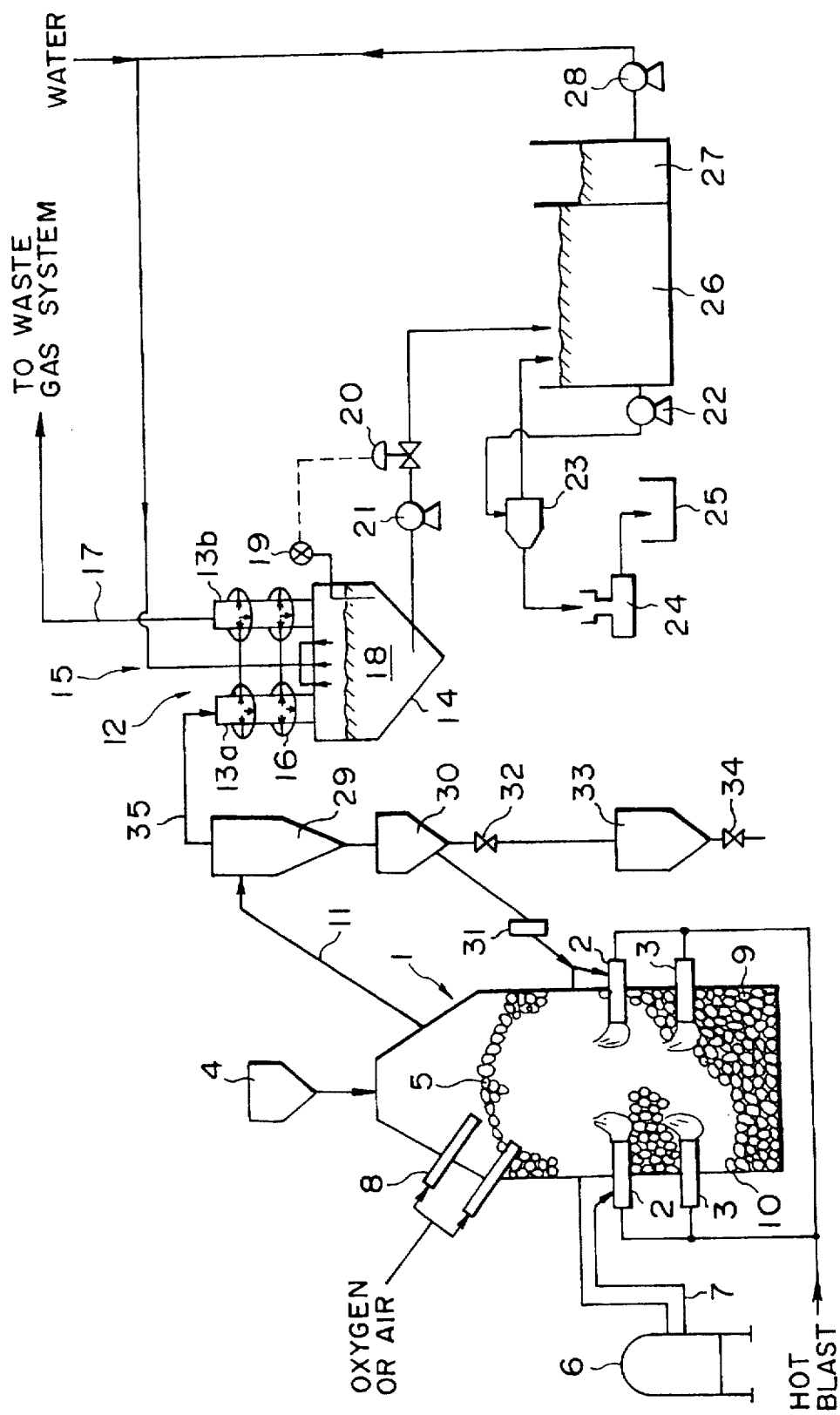
FIG. 2 illustrates an alternative embodiment of the present invention.

Turning now to FIG. 2, a cyclone 29 is provided between the shaft type smelting reduction furnace 1 and the cooling unit 12, and the furnace gas from the waste gas duct 11 is introduced into the cyclone 29.

The collected coarse dust mainly comprising carbon separated in the cyclone 29 passes through the hopper 30. Part of it is returned through a dust transport unit 31 and through the upper tuyere 2 into the furnace. The balance is discharged through a valve 32, a dust discharge hopper 33 and another valve 34 and out of the system.

The rest of the furnace gas passed out of the cyclone 29 is sent through a waste gas duct 35 to the cooling unit 12, where the furnace gas is cooled by cooling means 15, becoming a slurry 18 in suspension with cooling water at the bottom portion of the cooling tank 14. Subsequently, the slurry 18 is treated in essentially the same way as was described in connection with FIG. 1. By the foregoing method, high-concentration zinc can be obtained.

The zinc contained in the furnace gas is collected as a slurry in the cooling unit 12. It is possible to inhibit dust adhesion and occurrence of lumps in the cooling tank 14 and to avoid damage and other problems in the bag filter and in the discharge unit.

In the present invention the waste gas may be subjected to secondary combustion in a stage precedent to the water spray. In the treatment of a zinc-containing substance using a shaft type reduction furnace of the carbonaceous packed bed type, the waste gas contains a large quantity of Zn vapor. In the waste gas duct, dust comprising mainly zinc and zinc oxide tends to adhere in large quantities to the inner wall, causing impaired ventilation, leading to unstable operation.

We have discovered that, upon occurrence of impaired ventilation, a deposit mainly comprising a large quantity of a mixture of zinc oxide and carbon is formed on the waste gas duct inner wall. We have also discovered that impaired ventilation occurs essentially always during a time of low waste gas temperature. We have further discovered that, when the waste gas temperature is low, zinc oxide is more stable than Zn vapor even within a carbonaceous material packed bed that is believed to have a high temperature.

Figure 3:
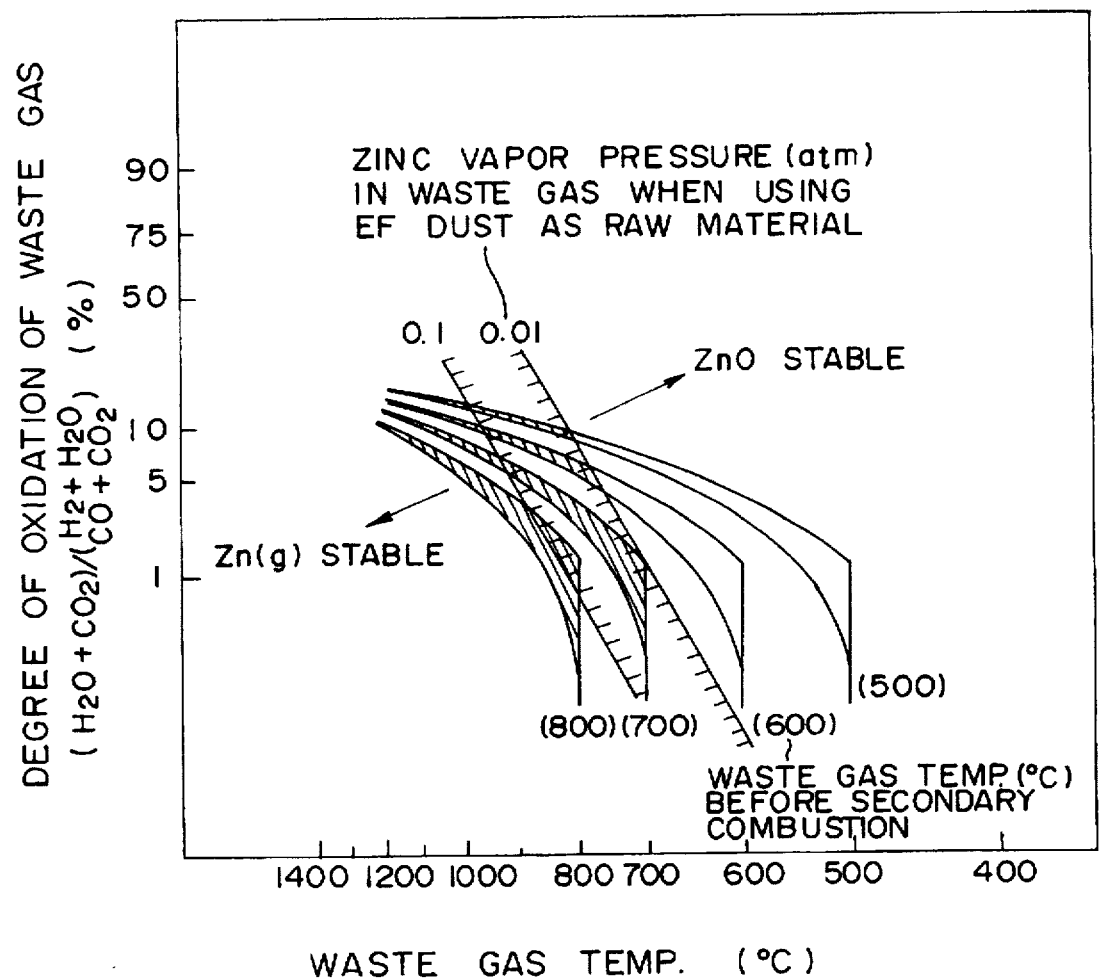
FIG. 3 is a graph which illustrates relationships of waste gas temperature and degree of oxidation of waste gas.

We have still further discovered that the waste gas temperature and the degree of oxidation of waste gas (($CO_2$+$H_2O$)/($CO$+$CO_2$+$H_2$+$H_2O$)) and the relative presence of Zn vapor or ZnO in the waste gas are as illustrated in the graph comprising FIG. 3 of the drawings. We have found that the Zn vapor pressure in the top gas varies with the zinc content in the zinc-containing substance. Within the scope of operation in which the present invention is applicable, such zinc vapor pressure is within the range of from about 0.01 to 0.1 atm. This is based upon measurements using a waste gas mass spectrometer, and/or based upon calculations derived from the chemical composition and sampled gas.

In order to keep the operations of the shaft type smelting reduction furnace stable without causing impaired ventilation it is necessary for zinc to be present in the form of Zn vapor in the top gas.

In the operation of the apparatus shown in FIG. 1 or FIG. 2, use of a secondary combustion burner 8 alone may lead to a lower temperature in the initial stage of operation even when attempting to keep the waste gas temperature at the furnace top at a level sufficient to ensure the presence of stable Zn vapor. To avoid this risk, as is shown in FIG. 4 for example, secondary combustion burners 36 and 37 for the duct are arranged in at least one of the waste gas ducts 11 and 35 of FIG. 2 to cause combustion of waste gas.

Adherence of dust in the waste gas ducts 11 and 35 can be detected based upon pressure loss in the ducts, from a change of temperature indicated by a thermometer installed in the duct, or from a change of temperature derived from measurement of the outer surface temperature of the duct. When it is necessary to locate the deposited dust, measurement is made of the internal pressure at a plurality of manometers or differential pressure gauges $P_1$ to $P_3$ (FIG. 4) installed longitudinally along the ducts, or a plurality of thermometers $t_1$ to $t_4$. This permits determination of the status of generation and positioning of deposits onto the duct.

Adherence of zinc oxide in the duct is avoided by adjusting, upon secondary combustion of waste gas in the waste gas ducts 11 and/or 35, the amount of oxygen or air to be blown into the ducts 11 and/or 35, and by appropriately maintaining the waste gas temperature and the degree of oxidation of waste gas. The waste gas temperature to be achieved by secondary combustion should comply with conditions as shown in FIG. 3, dependent upon the waste gas temperature and degree of oxidation of waste gas attained before secondary combustion and the partial pressure of Zn vapor in the waste gas.

Figure 4:
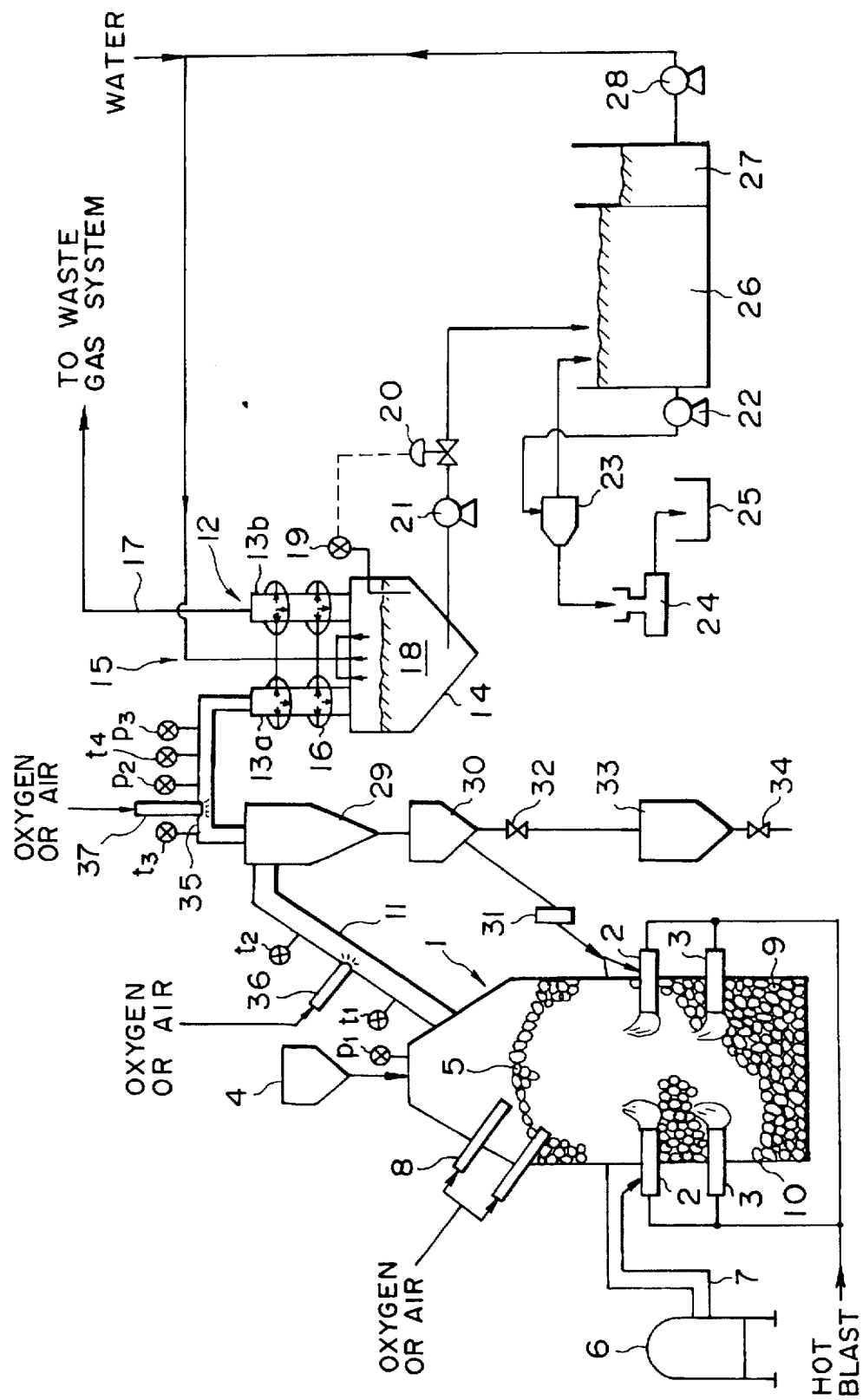
FIG. 4 illustrates a further embodiment of the present invention.

While FIG. 4 illustrates a single secondary combustion burner in each of the ducts 11 and 35, the number of secondary combustion burners may be increased or reduced in response to the operating conditions (status of deposition of zinc and zinc oxide). No special limitation is imposed on the number of installed burners.

Under conditions in the waste gas ducts 11 and 35 before secondary combustion including, for example, a waste gas temperature of 700° C. in the duct, and a partial pressure of Zn vapor in waste gas of 0.1 atm, the waste gas temperature after secondary combustion would be at least 1,000° C. when considering the increased degree of oxidation and the waste gas temperature increase brought about by secondary combustion, as is clear from FIG. 3.

By detecting the status of any deposited dust and its position in the waste gas ducts 11 and 35 at the exit portion of the furnace, and by adjusting the waste gas temperature and the degree of oxidation of the gas so as to stabilize Zn vapor while adjusting the combustion conditions for the secondary combustion burners in response to the information derived from this detection, it is possible to inhibit adherence of dust in the waste gas ducts, thereby avoiding operational difficulties or damage to furnace refractory, and to collect zinc stably in the dust at a high concentration, thus providing important advantages in reusing the zinc resources.

In the present invention, zinc contained in waste gas is collected in the form of slurry in the cooling tank 14. It is thus possible to inhibit adherence in the cooling tank 14 or the resultant production of lumps, and further to avoid difficulty or damage to the bag filter or the discharge unit. In addition, secondary combustion of waste gas in the waste gas duct makes it possible to inhibit deposition of dust in the waste gas duct and to avoid operational problems or damage to the furnace refractory. In any of these cases, zinc in the dust can be collected stably at a high concentration, and this is very favorable for reusing zinc resources.

The following examples have been selected for illustration of preferred operations, and are not intended to define or to limit the scope of the invention.

EXAMPLES

Example 1.

Using a shaft type smelting reduction furnace having a furnace diameter of 1.2 m, a height of 8.0 m, and three upper and three lower tuyeres as shown in FIG. 1, an electric furnace dust (T.Fe: 28.4%, Zn: 29.9%, Cr: 0.27%, Pb: 2.05%, Cd: 0.04%, $SiO_2$: 2.91%, $Al_2O_3$: 1.55%, CaO: 1.23%, MgO: 0.38%, MnO: 2.36%, $Na_2O$: 1.53% and $K_2O$: 0.81%) was treated under conditions including a hot blast of 1,650 $Nm^3$/hr, a blast temperature of 900° C., an oxygen enrichment of from 50 to 200 $Nm^3$/hr, a quantity of injected dust of from 600 to 900 kg/hr (the blend ratio of which was 85% electric furnace dust and 15% flux (limestone +silica)). The status of the operation during this treatment was investigated. The results are shown in Table 1, together with the test conditions.

TABLE 1

| | Comparative Example | Example 1 | Example 2 |
|---|---|---|---|
| Test conditions | | | |
| Injected EF dust (kg/hr) | 700 | 700 | 700 |
| Injected flux (kg/hr) | 140 | 140 | 140 |
| Waste gas temperature (°C.) | 812 | 785 | 800 |
| Dust collected in cyclone (kg/hr) | 105 | — | 101 |
| Cyclone dust recycle (kg/hr) | 70 | — | 67 |
| Dust discharged outside (kg/hr) | 35 | — | 34 |
| Dust on cyclone exit side (kg/hr) | 228 | — | 220 |
| Cooling method | Indirect | Direct | Direct |
| Liquid coolant (l/hr) | 50 | 30 | 30 |
| Test results | | | |
| Waste gas temperature after cooling (°C.) | 168–245 | 95 | 90 |
| Dust discharged from cooling tank (kg/hr) | 143 | — | — |
| Dust discharged from bag filter (kg/hr) | 85 | — | — |
| Slurry concentration in cooling tank (%) | — | 35 | 30 |
| Slurry concentration after dehydration (%) | — | 65 | 65 |
| Dust in slurry after dehydration (kg/hr) | — | 321 | 220 |
| Zn percentage in collected dust (%) | 63.6 | 64.5 | 65.2 |
| Collected Zn (kg/hr) | 144 | 207 | 144 |
| Dust discharged trouble from cooling tank | Observed | None | None |
| Damage to bag filter | Observed | — | — |
| Downtime ratio caused by equipment trouble (%) | 5.0 | 0 | 0 |
| Carbonaceous material consumption (kg/t-dust) | 1180 | 1010 | 985 |
| Metal production (t/d) | 4.6 | 4.9 | 4.9 |
| Evaluation | Bad | Good | Good |

As is clear from Table 1, when the electric furnace dust was treated in accordance with the present invention, no trouble occurred after the cooling unit, and zinc dust of a high concentration could be collected.

The metal obtained in the shaft type smelting reduction furnace in this test operation was a pig iron comprising from 90 to 93% Fe, from 1 to 2% Si, from 4.0 to 4.3% C, from 0.8 to 1.2% Mn, and from 0.6 to 0.9% Cr. The slag had a chemical composition comprising from 24 to 27% $SiO_2$, from 16 to 24% $Al_2O_3$, from 22 to 25% CaO, from 2.3 to 2.6% MgO and from 5.7 to 6.8% MnO.

Example 2.

Using a shaft type smelting reduction furnace having a furnace diameter of 1.2 m, a height of 8.0 m and three upper and three lower tuyeres, as shown in FIG. 4, an electric furnace dust was treated under the following conditions to determine the status of operation during treatment. The results of test and the test conditions are shown in Table 1.

The operating conditions were:

1) Blowing conditions:
   Quantity of hot blast: 1,650 $Nm^3$/hr
   Blast temperature: 900° C.
   Quantity of oxygen enrichment: 50 to 200 $Nm^3$/hr 2) Powder injecting conditions:
   Blend ratio: Electric furnace dust (same chemical composition as in Example 1): 85%
   Flux (limestone +silica): 15%
   Quantity of injection: 600 to 900 kg/hr As is evident from Table 1, when the electric furnace dust was treated in accordance with the present invention, no difficulty occurred in the waste gas duct, and a zinc dust of a high concentration was collected.

The metal obtained in the shaft type smelting reduction furnace in this Example was a pig iron comprising from 90 to 93% Fe, from 1 to 2% Si, from 4.0 to 4.3% C, from 0.8 to 1.2% Mn and from 0.6 to 0.9% Cr. The slag had a chemical composition comprising from 24 to 27% $SiO_2$, from 16 to 24% $Al_2O_3$, from 22 to 25% CaO, from 2.3 to 2.6% MgO and from 5.7 to 6.8% MnO.

According to the present invention, as described above, it is possible to directly treat a zinc-containing substance such as electric furnace dust, and to separate and collect dust and hot metal in a single shaft type smelting reduction furnace, all at minimized cost. It is also possible to collect zinc with high efficiency from a zinc-containing substance, thus serving to effective utilization of resources.

Although this invention has been shown and described with respect to several selected embodiments, it will be appreciated that many variations may be made, including substitution of equivalents, reversal of parts and of sequence of method steps, and the use of certain features independently of other features, all without departing from the spirit and scope of this invention as defined in the appended claims.

What is claimed is:

1. A method of collecting zinc from a zinc-containing substance in a smelting reduction furnace having an inlet area and an exit area and provided with a packed bed of a carbonaceous solid reducing agent and having upper and lower tuyeres, which comprises the steps of:

injecting a zinc oxide-containing substance together with a flux through at least one of said upper tuyeres;

generating a furnace gas within said furnace comprising a dust mainly consisting of carbon and ash, and waste gas, containing Zn vapor, and combustion products generated by combustion of said carbonaceous solid reducing agent in said furnace, contacting said furnace gas with a liquid coolant at said exit area of said furnace, thereby taking up zinc in said liquid coolant to form a slurry, while separating the resulting gases from said exit area, removing said slurry containing said liquid coolant, processing said slurry and collecting said zinc therefrom.

2. A method according to claim 1, including the step of separating most of the carbon and some of said zinc from said furnace gas before contacting said liquid coolant with said resulting gases.

3. A method according to claim 1, with the further step of pre-forming said zinc-containing substance into powder before injecting it.

4. A method according to claim 1, including the step of dehydrating said slurry, wherein a solid substance in said slurry after dehydration has a concentration within a range of from about 40% to 80%.

5. A method according to claim 1, further comprising the step of subjecting said furnace gas to secondary combustion after vaporization of said metallic zinc but prior to contact of said furnace gas with said liquid coolant.

6. The method defined in claim 1, including the step of maintaining the temperature of said carbonaceous solid reducing agent at about 600° to 1000° C.

7. The method defined in claim 1, including the step of controlling the partial pressure of Zn vapor in said reducing furnace gas to the range of from about 0.01 to 0.1 atmosphere.

8. The method defined in claim 1, including the further step of taking pressure measurements in said furnace exit area and in the exit area of a cooling unit which is disposed behind said furnace, for obtaining the difference of pressures between said areas to judge the degree of adherence of dust in the waste gas thereby stabilizing the resulting Zn vapor in said area.

* * * * *